US009758179B2

United States Patent
Cinarci et al.

(10) Patent No.: US 9,758,179 B2
(45) Date of Patent: Sep. 12, 2017

(54) RAIL VEHICLE WITH PRESSURE SURGE-SAFE GRAYWATER LINE

(71) Applicant: SIEMENS AKTIENGESELLSCHAFT, Munich (DE)

(72) Inventors: Turgay Cinarci, Roesrath (DE); Ralph Gaertner, Brueggen (DE); Christian Huebsch, Duesseldorf (DE); Christian Schneider, Dinslaken (DE)

(73) Assignee: Siemens Aktiengesellschaft, Munich (DE)

( * ) Notice: Subject to any disclaimer, the term of this patent is extended or adjusted under 35 U.S.C. 154(b) by 150 days.

(21) Appl. No.: 14/652,187

(22) PCT Filed: Nov. 14, 2013

(86) PCT No.: PCT/EP2013/073788
§ 371 (c)(1),
(2) Date: Jun. 15, 2015

(87) PCT Pub. No.: WO2014/090500
PCT Pub. Date: Jun. 19, 2014

(65) Prior Publication Data
US 2015/0329126 A1     Nov. 19, 2015

(30) Foreign Application Priority Data
Dec. 14, 2012 (DE) ........................ 10 2012 223 242

(51) Int. Cl.
*E03D 11/00* (2006.01)
*B61D 35/00* (2006.01)
(Continued)

(52) U.S. Cl.
CPC ........... *B61D 35/00* (2013.01); *B61D 35/002* (2013.01); *F16K 3/30* (2013.01); *E03F 1/006* (2013.01);
(Continued)

(58) Field of Classification Search
CPC ......... Y10T 137/0753; Y10T 137/1026; Y10T 137/2703; Y10T 137/9464
(Continued)

(56) References Cited

U.S. PATENT DOCUMENTS 1,749,356 A  *  3/1930  Ross .................... B61D 35/007
                                                        4/323
2,612,186 A       9/1952  Bolger
(Continued)

FOREIGN PATENT DOCUMENTS

DE  102008007748 A1  8/2009
DE  102007004832 B4   3/2011
(Continued)

OTHER PUBLICATIONS

Machine Translation of JP 2007296968, printed Mar. 2017.*

*Primary Examiner* — R. K. Arundale
(74) *Attorney, Agent, or Firm* — Laurence Greenberg; Werner Stemer; Ralph Locher

(57) ABSTRACT

A rail vehicle includes a graywater line which is in communication with the surroundings of the rail vehicle directly or by way of a collecting container. The graywater line is equipped with a pressure protection valve, which protects a graywater line section upstream of the pressure protection valve from pressure surges occurring in the surroundings of the rail vehicle. The pressure protection valve is constructed as a pinch valve which is controlled by a control device in order to protect the graywater line section from pressure surges.

7 Claims, 5 Drawing Sheets

(51) Int. Cl.
*F16K 3/30* (2006.01)
*E03F 1/00* (2006.01)

(52) U.S. Cl.
CPC .... *Y10T 137/1044* (2015.04); *Y10T 137/7758* (2015.04)

(58) Field of Classification Search
USPC .................................................... 4/420–442
See application file for complete search history.

(56) References Cited

U.S. PATENT DOCUMENTS

| | | | | |
|---|---|---|---|---|
| 4,216,554 | A | * | 8/1980 | Glueckert .............. B61D 35/00 137/350 |
| 5,232,010 | A | * | 8/1993 | Rozenblatt ............. B64D 11/02 137/347 |
| 5,369,811 | A | * | 12/1994 | Serre .................... B61D 35/007 4/210 |
| 6,006,373 | A | * | 12/1999 | Hoang .................... E03F 1/006 4/321 |
| 6,085,366 | A | * | 7/2000 | Pondelick ................ E03D 3/10 4/321 |
| 2003/0229939 | A1 | * | 12/2003 | Berman .................. B60R 15/04 4/434 |
| 2008/0201832 | A1 | | 8/2008 | Seibt |

FOREIGN PATENT DOCUMENTS

| | | |
|---|---|---|
| DE | 202010014643 U1 | 1/2012 |
| EP | 1291468 A2 | 3/2003 |
| JP | 2007296968 A | 11/2007 |

* cited by examiner

RAIL VEHICLE WITH PRESSURE SURGE-SAFE GRAYWATER LINE

BACKGROUND OF THE INVENTION

Field of the Invention

The invention relates to a rail vehicle having a graywater line, which is connected to an area surrounding the rail vehicle directly or via a collection container, wherein the graywater line is equipped with a pressure protection valve, which protects a segment of the graywater line upstream of the pressure protection valve from pressure surges occurring in the area surrounding the rail vehicle.

Particularly in high-speed trains, a pressure tight passenger compartment plays a significant role: while the train is in motion, differences between an ambient pressure and a car interior pressure can occur, especially when traveling through tunnels or when encountering other trains, and these produce pressure fluctuations in the passenger compartment that should be avoided for reasons of comfort. Any lack of leaktightness in the car through which pressure surges can propagate in the vehicle should therefore be avoided.

For reasons of design, however, it is not possible to avoid all openings in a rail vehicle, for which reason special pressure protection solutions have to be installed at the locations concerned.

One of these openings is the graywater line leading to the collecting container for the sanitary equipment. The graywater line connects the outlet from a hand-wash basin of the sanitary equipment to the collecting container of the rail vehicle, for example. In high-speed trains, for example, the collecting container is arranged outside the passenger compartment, in the underfloor region. It has an overflow line, and there is therefore a continuous open connection to the surrounding area.

Embodiments of rail vehicles in which the graywater line from the hand-wash basin does not lead to a collecting container but directly to the outside in order to take the graywater directly onto the track are also known. In this case too, there is a connection between the area surrounding the rail vehicle and, via the graywater line, the interior thereof.

It is therefore possible for an excess pressure surge to propagate through the wastewater container or directly through the graywater line as far as the hand-wash basin and hence into the interior of the rail vehicle or for a vacuum at this location to suck air out of the rail vehicle. The graywater line must therefore be provided with a pressure protection solution which, however, does not prevent the graywater from draining away.

In order therefore to allow pressure protection for the interior of the rail vehicle and to allow graywater to drain away, the graywater line is fitted with a valve. DE 10 2008 007 748 A1, for example, discloses a duckbill valve, which consists of a specially molded rubber element installed in the graywater line. The design is such that the rubber element ends with flat mutual contact. If this element is subjected to a load by water from its upstream side, the weight of the water pushes the element apart, allowing the water to drain away. An excess pressure surge occurring upstream does not allow this valve to open. On the contrary, an excess pressure merely presses the element more tightly together, thus preventing pressure from being transmitted in the direction of the interior of the rail vehicle in an effective manner.

This embodiment of a valve operates passively and, by virtue of its design, does not close the opening permanently or absolutely.

BRIEF SUMMARY OF THE INVENTION

On this basis, it is the underlying object of the invention to develop the rail vehicle mentioned at the outset in such a way that better security against pressure surges in the area surrounding it is made possible.

This object is achieved by virtue of the fact that the pressure protection valve is designed as a pinch valve, which is controlled by a control device in order to protect the segment of the graywater line from pressure surges.

In this way, the valve which serves to protect the upstream segment of the graywater line is actively controlled, thereby improving protection from external pressure surges in an effective manner.

According to a preferred embodiment, it is envisaged that the control device opens or closes the pinch valve in accordance with actuation of a water consumer connected to the graywater line, said actuation being detected by means of a sensor. For example, actuation of a water tap on a hand-wash basin can be detected with the aid of a sensor. When this sensor outputs a signal which represents actuation of the water tap, this signal is transmitted to the control device for the pinch valve, with the result that the pinch valve, which can otherwise be permanently closed, is opened.

The control device can control the pinch valve in accordance with a signal coming from the train control system of the rail vehicle, for example. Such a signal indicates whether a pressure surge is to be expected from the area surrounding the rail vehicle or whether a general operating situation of the rail vehicle is such that there is a high probability of pressure surges. For example, the signal coming from the train control system can be a speed signal and can be evaluated by the control device for the pinch valve in such a way that exceeding of a threshold value for the speed signal prevents opening of the pinch valve. This is based on the fact that high speeds entail an increased probability of pressure surges, and therefore the pinch valve should advantageously be closed at these speeds.

To indicate a pressure surge, it is also possible to exploit the fact that, in some embodiments of rail vehicles, a pressure surge signal which controls pressure protection flaps of an air-conditioning system and closes said flaps when required is generated. This pressure surge control signal can be used to close the pinch valve by means of the control device if a pressure surge occurs.

The control device can open or close the pinch valve in accordance with a pressure surge detected by means of a pressure sensor. For this purpose, the graywater line or the collecting container for graywater can be fitted with the pressure sensor for detecting a pressure surge, wherein the pressure sensor is arranged downstream of the pinch valve or, in other words, on an outward-directed side of the pinch valve.

A signal generated by the sensor, which indicates the presence of a pressure surge, is passed to the control device for the pinch valve, which thereupon closes the pinch valve. This can also apply, for example, when a sensor on a water tap indicates the actuation thereof, as explained above. The resulting procedure here is such that the avoidance of penetration of a pressure surge into the interior of the vehicle always takes precedence over rapid drainage of graywater.

The control device for the pinch valve can control a further pinch valve, which is connected in series with the pinch valve, wherein the control device controls the two pinch valves in such a way that at least one of the pinch valves is always closed. This ensures that the graywater line is always closed by at least one of the two pinch valves provided, and therefore reverse surges cannot act on the interior of the rail vehicle. To drain graywater, the pinch valves can be alternately opened and closed.

BRIEF DESCRIPTION OF THE SEVERAL VIEWS OF THE DRAWING

Illustrative embodiments of the invention are explained in greater detail below with reference to the drawings. In the figures, functionally identical components are denoted by the same reference signs. In the drawings.

DESCRIPTION OF THE INVENTION

Figure 1:
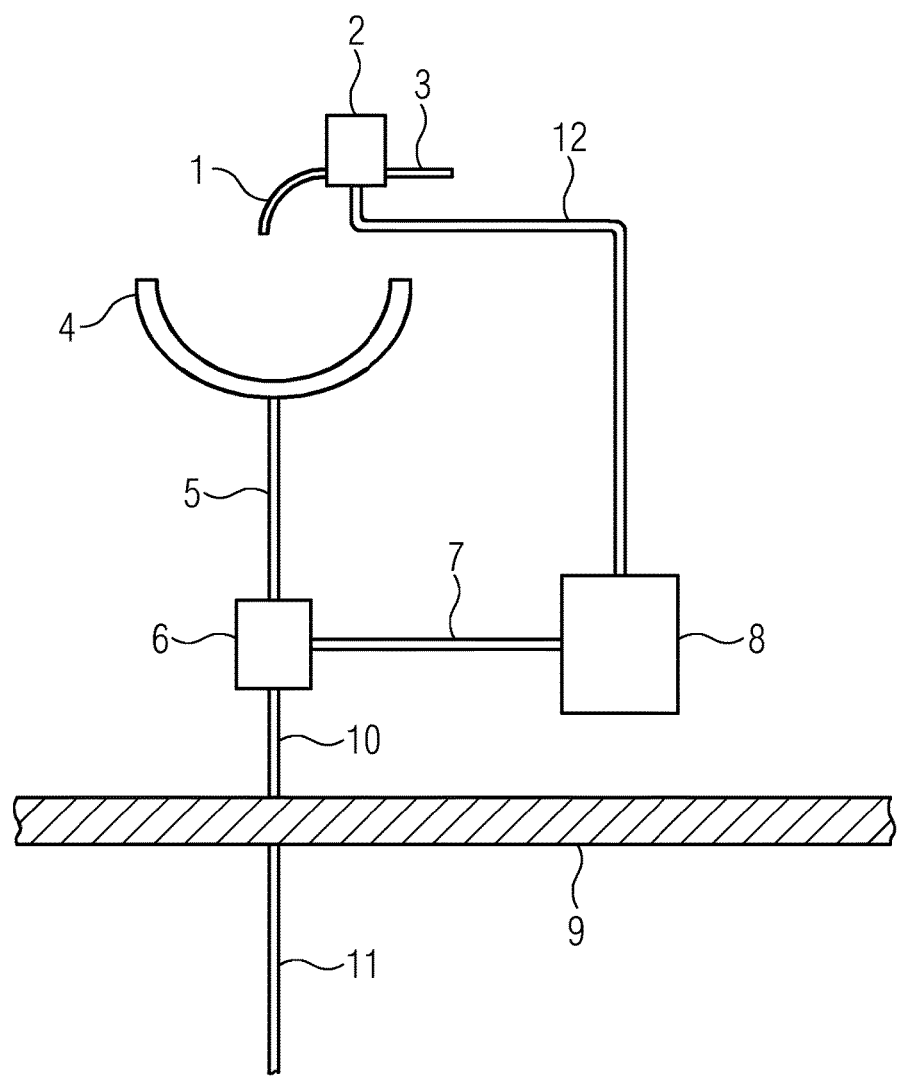
FIG. 1 shows a schematic view of a sanitary arrangement in a rail vehicle in a first embodiment.

In the embodiment according to FIG. 1, a water tap 1 is illustrated, which can be opened by means of an actuation sensor 2 and is supplied with fresh water via a water feed line 3. Graywater is collected in a wash basin 4, which can be regarded as a water consumer together with the water tap 1, and leaves said wash basin via a graywater line 5. A pneumatically controllable pinch valve 6 is provided at the downstream end of said line. A control device 8 for the pinch valve controls the opening and closing movements of said valve via a control line 7.

When the pinch valve 6 is opened, graywater initially flows as far as a car body wall 9, namely via an outlet line 10, which extends from the pinch valve 6 to the car body wall 9. The graywater is finally carried away via an outlet line 11 outside the rail vehicle, which is connected to the outlet line 10.

The pinch valve 6 is controlled in such a way by means of the control device 8 that it is fundamentally held closed, preventing pressure surges which occur in the area surrounding the rail vehicle from propagating into the interior of the rail vehicle. However, the control device 8 is connected to the actuation sensor 2 for the water tap 1 via a control line 12. When the actuation sensor 2 indicates actuation of the water tap 1, the control device 8 opens the pinch valve for a period of time which allows the graywater to drain away completely.

Figure 2:
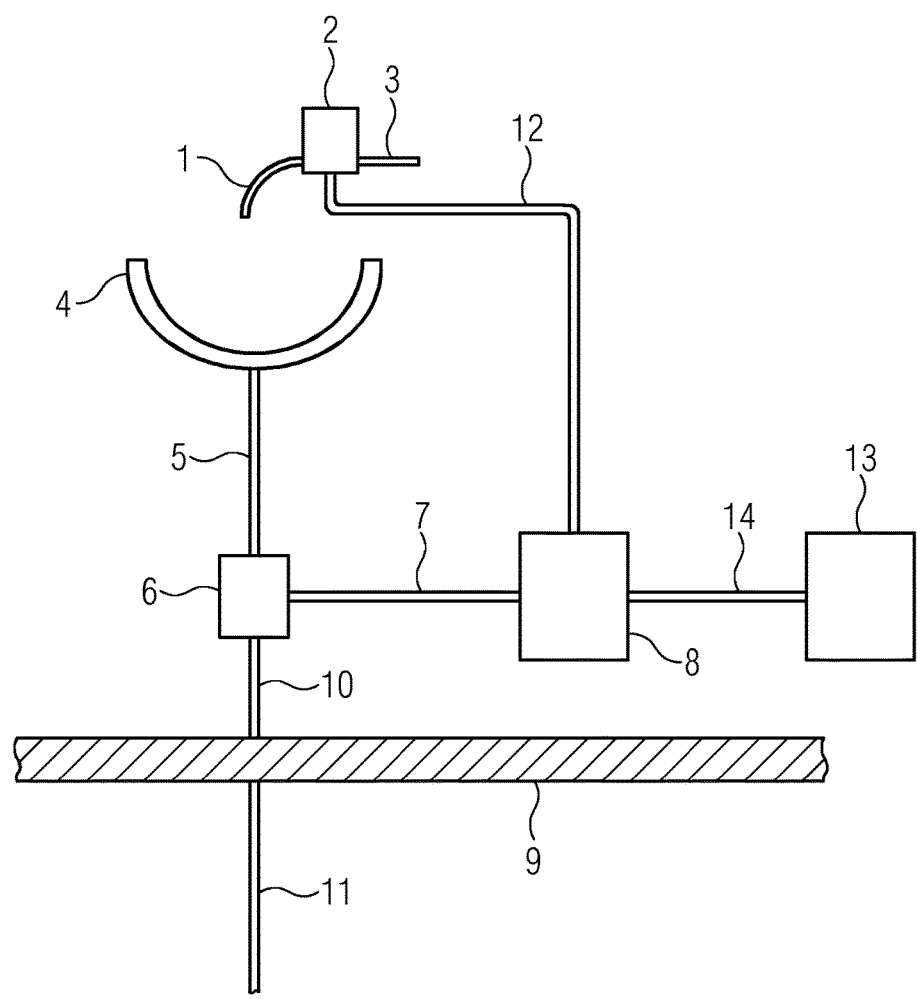
FIG. 2 shows a schematic view of a sanitary arrangement in a rail vehicle in a second embodiment.

In the embodiment illustrated in FIG. 2, the version of FIG. 1 is supplemented inasmuch as the control device 8 for the pinch valve 6 is additionally connected to a signal source 13, which indicates via a control line 14 a pressure surge to be expected. The signal source 13 can be a train control system of the rail vehicle, for example. In the train control system, it is possible, for example, to generate a control signal which represents a speed of the rail vehicle. Since it can be assumed that an increased speed also entails an increased probability of the occurrence of pressure surges, the speed signal coming from the train control system via control line 14 can be evaluated in such a way that speeds above a speed threshold value entail closure of the pinch valve 6. Here, the signal coming via control line 14 from the signal source 13, which indicates a pressure surge to be expected, has priority over the signal which passes from the actuation sensor 2 for the water tap 1 via control line 12 to the control device 8 for the pinch valve 6. In other words, the pinch valve 6 remains closed even if actuation of the water tap 1 is indicated but an imminent pressure surge is simultaneously indicated by the signal source 13.

Figure 3:
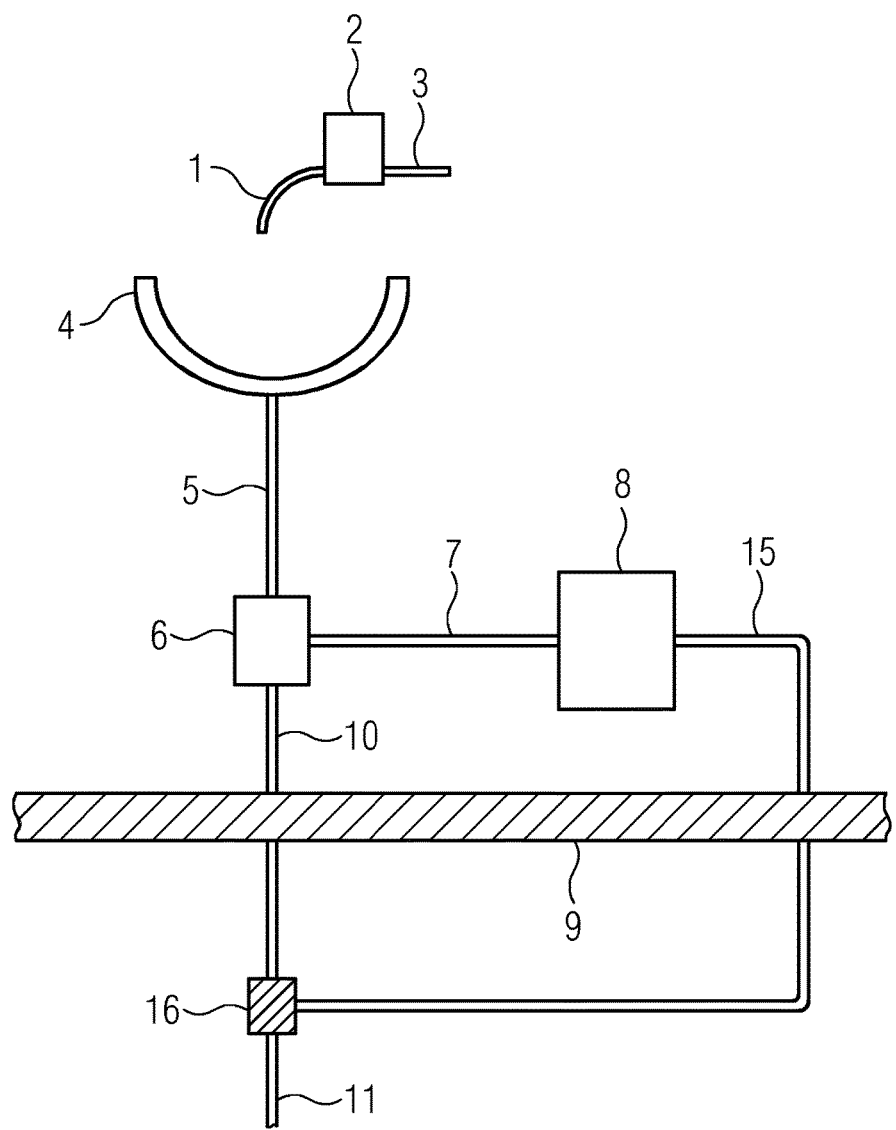
FIG. 3 shows a schematic view of a sanitary arrangement in a rail vehicle in a third embodiment.

FIG. 3 then shows an embodiment in which the control device 8 is connected to a separate pressure sensor 16 for indicating a pressure surge via a signal line 15. The pressure sensor 16 is situated downstream of the pinch valve 6, in particular on the other side of the car body wall 9, on an external side of the rail vehicle. As soon as the pressure sensor 16 detects a pressure surge, this surge is indicated to the control device 8, which thereupon closes the pinch valve 6. The pinch valve 6 can remain open as long as the pressure sensor 16 is not indicating the occurrence of a pressure surge.

Figure 4:
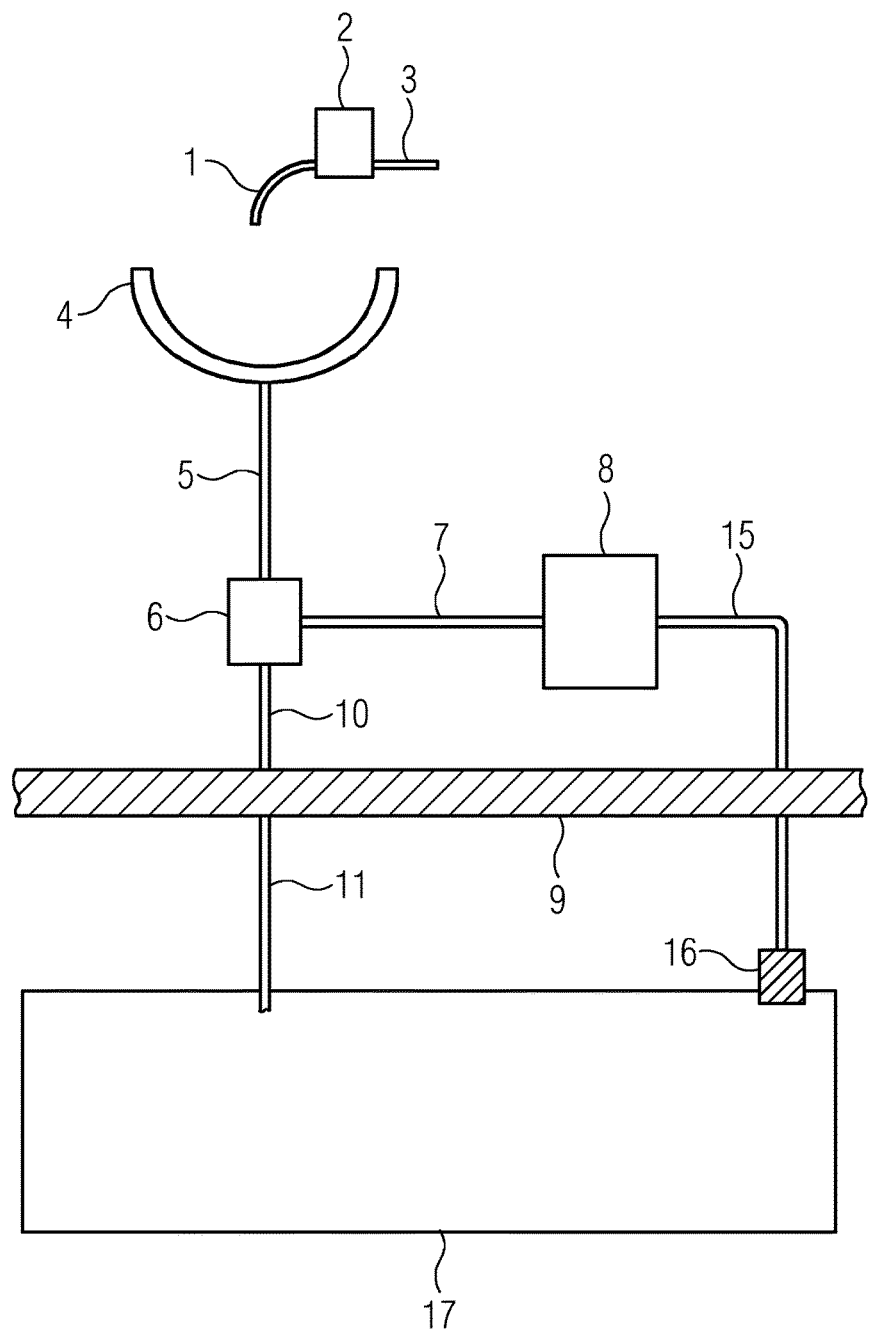
FIG. 4 shows a schematic view of a sanitary arrangement in a rail vehicle in a fourth embodiment.

The embodiment according to FIG. 4 differs from that according to FIG. 3 in that the pressure sensor 16 is provided on a collecting container 17 for graywater. To this extent, the embodiment according to FIG. 3 relates to the application in which the pressure sensor 16 is arranged in the outlet line 11 for the purpose of detecting a pressure surge, wherein the outlet line 11 opens directly onto a track. In the embodiment according to FIG. 4, the graywater which is discharged via the outlet line 11 is collected in the collecting container 17, which is emptied at a later time.

Although no signal connection between the actuation sensor for the water tap 1 and the control device 8 is shown in the embodiments according to FIGS. 3 and 4, additional indication of the actuation state of the water tap 1 for the control device 8 would also be possible in the embodiments according to FIGS. 3 and 4.

Figure 5:
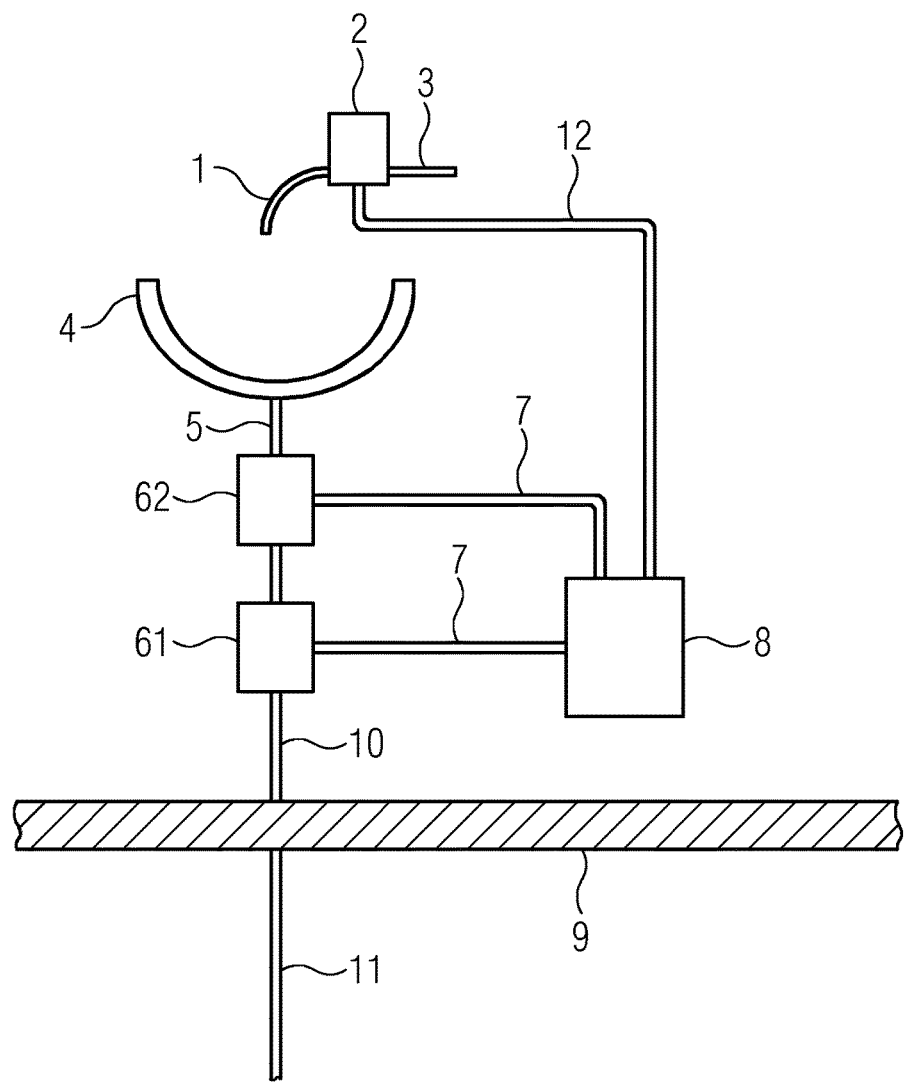
FIG. 5 shows a schematic view of a sanitary arrangement in a rail vehicle in a fifth embodiment.

Another embodiment, in which two pinch valves 61, 62 are arranged in series downstream of the wash basin 4 and are each in signal communication with the control device 8, is illustrated by means of FIG. 5. As in the embodiments according to FIGS. 1 and 2, the control device 8 is connected to the actuation sensor 2 for the water tap 1 via control line 12. The control device 8 controls the pinch valves 61, 62 in such a way that one of the two pinch valves 61, 62 is closed in each case. If, for example, the hand-wash basin 4 is used, pinch valve 62, which is closer to the hand-wash basin 4 than pinch valve 61, is first of all opened by means of the control device 8, with the result that the graywater collects ahead of the closed pinch valve 61. Pinch valve 62 is then closed and pinch valve 61 is opened, allowing the graywater to leave the rail vehicle via the outgoing line 11. Since one of the two pinch valves 61, 62 is always closed, penetration of a pressure surge into the interior of the rail vehicle is prevented in an effective manner.

The invention claimed is:

1. A rail vehicle, comprising: a graywater line in communication with an exterior of the rail vehicle directly or through a collection container; a pressure protection pinch valve disposed in said graywater line and defining a segment of said graywater line upstream of said pressure protection pinch valve; and a control device controlling said pressure protection pinch valve to protect said segment of said graywater line from pressure surges occurring exterior of the rail vehicle; said control device controlling said pinch valve in accordance with a signal generated in the rail vehicle indicating an occurrence of a pressure surge.

2. The rail vehicle according to claim 1, which further comprises:
a water consumer connected to said graywater line; and
a sensor detecting an actuation of said water consumer;

said control device opening or closing said pinch valve in accordance with the actuation of said water consumer.

3. The rail vehicle according to claim 2, wherein said control device opens said pinch valve only when actuation of said water consumer is detected.

4. The rail vehicle according to claim 1, wherein said signal generated in the rail vehicle is a speed signal, and said control device for said pinch valve evaluates the speed signal and prevents opening of said pinch valve if a threshold value for the speed signal is exceeded.

5. The rail vehicle according to claim 1, which further comprises a pressure sensor, said control device opening or closing said pinch valve in accordance with a pressure surge detected by said pressure sensor.

6. The rail vehicle according to claim 5, wherein said graywater line or said collecting container is equipped with said pressure sensor for detecting a pressure surge, and said pressure sensor is disposed downstream of said pinch valve.

7. The rail vehicle according to claim 1, which further comprises:
   a further pinch valve connected in series with said pinch valve and controlled by said control device;
   said control device controlling said two pinch valves to ensure that at least one of said pinch valves is always closed.

\* \* \* \* \*